United States Patent [19]
Maruyama

[11] Patent Number: 5,870,354
[45] Date of Patent: Feb. 9, 1999

[54] DATA RECORDING AND REPRODUCING APPARATUS CAPABLE OF DETECTING AN INPUT FOR CONTROLLING AN OUTPUT

[75] Inventor: Hirohisa Maruyama, Tachikawa, Japan

[73] Assignee: Casio Computer Co., Ltd., Tokyo, Japan

[21] Appl. No.: 880,899

[22] Filed: Jun. 23, 1997

[30]    Foreign Application Priority Data

Jun. 27, 1996 [JP] Japan ..................................... 8-167557

[51] Int. Cl.⁶ .................................................. G11B 31/00
[52] U.S. Cl. ............................................... 369/23; 368/63
[58] Field of Search .......................... 369/23, 22; 360/12, 360/27; 368/10, 63, 73, 75; 365/45

[56]               References Cited

U.S. PATENT DOCUMENTS

| | | | |
|---|---|---|---|
| 4,391,530 | 7/1983 | Wakabayashi et al. | 368/63 |
| 4,477,848 | 10/1984 | McWhirter et al. | 360/60 |
| 4,548,511 | 10/1985 | Yabe | 368/10 |
| 5,088,056 | 2/1992 | McIntosh et al. | 364/569 |
| 5,161,199 | 11/1992 | David . | |
| 5,199,009 | 3/1993 | Svast . | |

*Primary Examiner*—Tan Dinh
*Attorney, Agent, or Firm*—Frishauf, Holtz, Goodman, Langer & Chick

[57]               ABSTRACT

A data storing/reproducing apparatus includes a storing unit for storing inputted data, a range designating unit for designating an arbitrary range within the inputted data, an outputting unit for outputting the data stored in the storing unit, and a control unit for not outputting data in a range designated by said range designating unit when the data stored in the storing unit is outputted from the outputting unit. In this data storing/reproducing apparatus, when voice or sound is externally entered to be stored in the storing unit, and voice data is reproduced/outputted, a range used to limit the voice data output is set by the range setting unit. Then, when the data stored in the storing means is outputted by the outputting unit, since no data is outputted only in the designated range under control of the control unit, the secrecy of the stored voice data can be maintained.

10 Claims, 6 Drawing Sheets

DATA RECORDING AND REPRODUCING APPARATUS CAPABLE OF DETECTING AN INPUT FOR CONTROLLING AN OUTPUT

BACKGROUND OF THE INVENTION

1. Field of the Invention

The present invention generally relates to a data storing/reproducing method, a data storing/reproducing apparatus, and a recording medium for recording thereon a data recording/reproducing program. More specifically, the present invention is directed to data recording/reproducing method/apparatus for limiting reproduction outputs of recorded data.

2. Description of the Prior Art

Conventionally, various types of storing/reproducing apparatuses are known in the field. In one conventional storing/reproducing apparatus, a sound (voice) signal externally supplied is A/D-converted (namely, coded) into sound data, and then the sound data is stored into a semiconductor memory such as a RAM. The coded sound data stored in the RAM is read by operating a reproducing switch to be decoded (namely, D/A-converted), so that the sound is produced.

On the other hand, there are voice data which are not wanted to be disclosed to third parties among voice data recorded by an individual. However, in the conventional recording/reproducing apparatuses, when the reproducing switch is manipulated, anyone can hear the contents of the recorded data. Therefore, secrecy of the recorded data could not be maintained.

To avoid the above-described problem, various sorts of electronic notebooks and personal computers are commercially available. That is, in these appliances, passwords are previously determined, and are entered by using character keys to be stored. Then, character data such as names and telephone numbers are not displayed, or not erased unless the correct passwords are inputted.

In the case that such a password technique is utilized in the voice recording, namely where the voice cannot be reproduced unless the proper password is entered, there is a problem in that voice recordings whose secrecy need not be maintained could not be reproduced either.

Also, there is another problem in that even when the reproducing switch is manipulated, if no voice is reproduced, then the user could not grasp the actual condition. That is, the user could not understand whether voice data could not be reproduced because the password had been set or because no voice data had been recorded.

Furthermore, in order to avoid erroneous erasing of voice data, for instance, the such conventional devices do not enable voice data to be overwritten on previously stored voice data unless the correct password is entered. In this case, the correct password must be entered every time the voice data is overwritten. This results in very complex/cumbersome operations.

SUMMARY OF THE INVENTION

The present invention has been made to solve the above-described problems, and therefore, has an object to provide a data storing/reproducing method/apparatus capable of storing/reproducing voice data while maintaining secrecy of important voice recordings.

To achieve the object, a data storing/recording apparatus, according to an aspect of the present invention, is featured by comprising:

data input means for inputting data;
range designating means for designating an arbitrary range within the data inputted by the data input means;
data storing means for storing therein the data inputted by the data input means;
output means for outputting data stored in the data storing means;
detecting means for detecting whether or not the data outputted by the output means corresponds to data present in the range designated by the range designating means; and
output control means for controlling the output means not to output the data present within the range when a detection is made by the detecting means such that the data outputted by the output means corresponds to the data present in the range designated by the range designating means.

Also, a data outputting method, according to another aspect of the present invention, is featured by comprising:

a data inputting step for inputting data;
a range designating step for designating an arbitrary range within the data inputted by the data inputting step;
a data storing step for storing therein the data inputted by the data inputting step;
an outputting step for outputting data stored in the data storing step;
a detecting step for detecting whether or not the data outputted by the outputting step corresponds to data present in the range designated by the range designating step; and
an output controlling step for controlling the outputting step not to output the data present within the range when a detection is made by the detecting step such that the data outputted by the outputting step corresponds to the data present in the range designated by the range designating step.

Furthermore, according to another aspect of the present invention, a recording medium for recording thereon a data output program, is featured in that in response to this data output program, a computer is operable as:

data storing means for storing therein data inputted by data input means;
output means for outputting data stored in the data storing means;
detecting means for detecting whether or not the data outputted by the output means corresponds to data present in a range designated by a range designating means; and
output control means for controlling the output means not to output the data present within the range when a detection is made by the detecting means such that the data outputted by the output means corresponds to the data present in the range designated by the range designating means.

With employment of such arrangements, the secrecy of the stored voice data can be maintained, and also such voice data whose secrecy need not be maintained can be continuously reproduced without any cumbersome operations.

BRIEF DESCRIPTION OF THE DRAWINGS

The invention will be understood more clearly on reading the following description with reference to the drawings, in which.

DESCRIPTION OF THE PREFERRED EMBODIMENTS

OVERALL CIRCUIT ARRANGEMENT OF ELECTRONIC WATCH

In an embodiment of the present invention, a data storing/reproducing apparatus according to the present invention is assembled into an electronic wrist watch.

Figure 1:
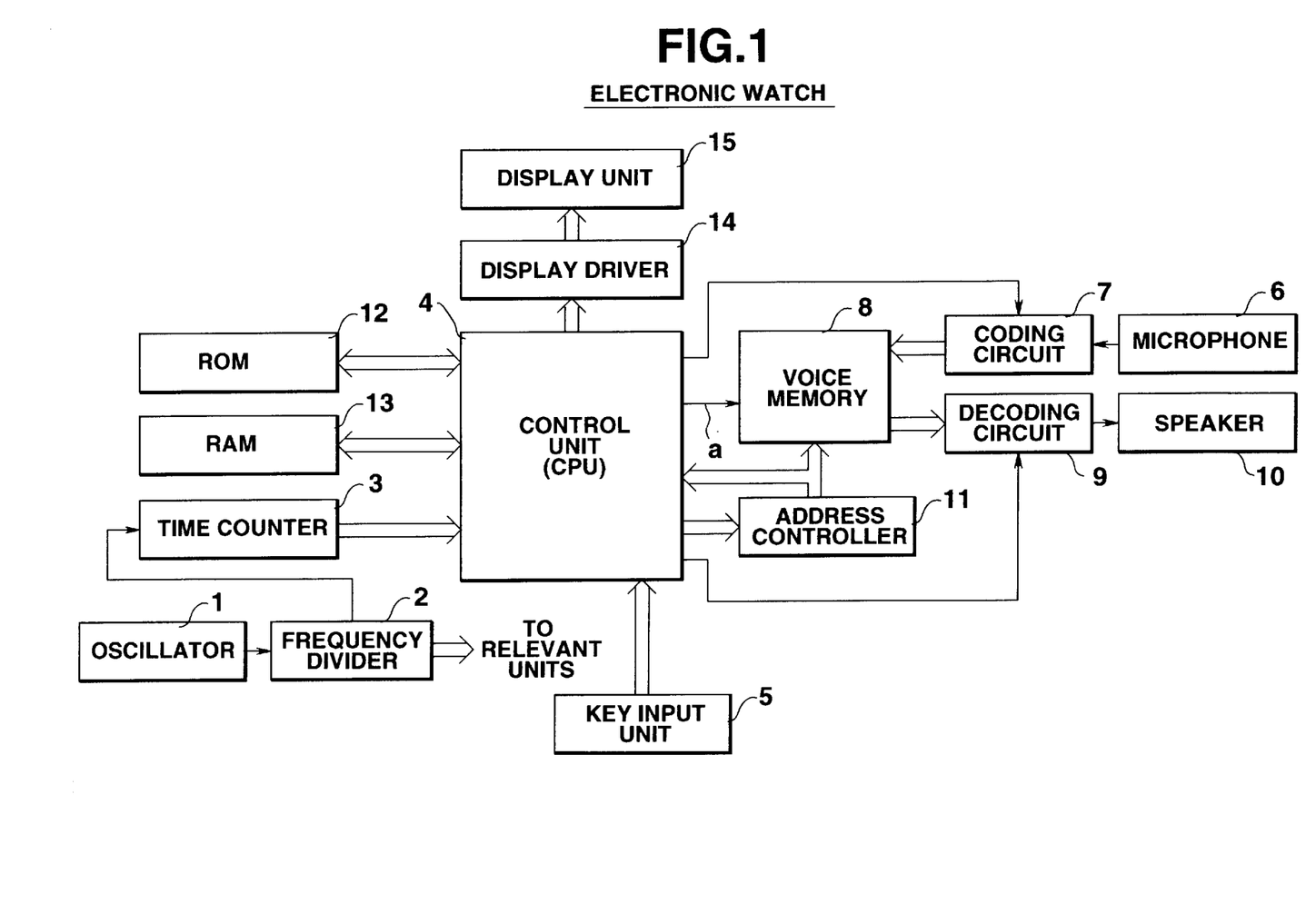
FIG. 1 is a circuit block diagram of a data storing/reproducing apparatus according to an embodiment of the present invention.

That is, FIG. 1 is a circuit block diagram of an electronic wrist watch into which a data storing/reproducing apparatus arranged in accordance with a first preferred embodiment of the present invention is assembled.

In this circuit, a clock signal produced from an oscillator circuit 1 is frequency-divided by a frequency dividing circuit 2, so that a time count signal functioning as a time counting reference is outputted to a time counting circuit 3, and also a clock signal functioning as an operation reference is outputted to relevant circuit units.

The time counting circuit 3 counts the time count signal to thereby obtain time count data, and supplies this time count data to a control unit 4.

A key input unit 5 is an input unit capable of recording/reproducing voice (sounds), of setting a secrecy, and of inputting password data.

While the recording operation is carried out, a voice (sound) signal entered from a microphone 6 is coded by a coding circuit 7 to produce digital voice data, and then the digital voice data are sequentially written at corresponding addresses in a voice memory 8. While the reproducing operation is carried out, the voice data stored in the voice memory 8 is read out, and the read voice data is decoded by a decoding circuit 9 to obtain an analog voice signal. Thus, this analog voice signal is supplied to a speaker 10 so as to reproduce the voice. It should be noted that both the write address control and the read address control of the voice memory 8 are carried out by an address control circuit 11.

A control unit 4 executes a key process operation, a recording process operation, and the like (will be discussed later) in accordance with a control program previously stored in a ROM 12, and stores data about the process results into a RAM 13. Also, the control unit 4 outputs character data entered from the key input unit 5 to a display drive circuit 14 in order to display the content of the inputted character data on a display unit 15 constructed of a liquid crystal display (LCD) device.

STORAGE STRUCTURE OF RAM

Figure 2:
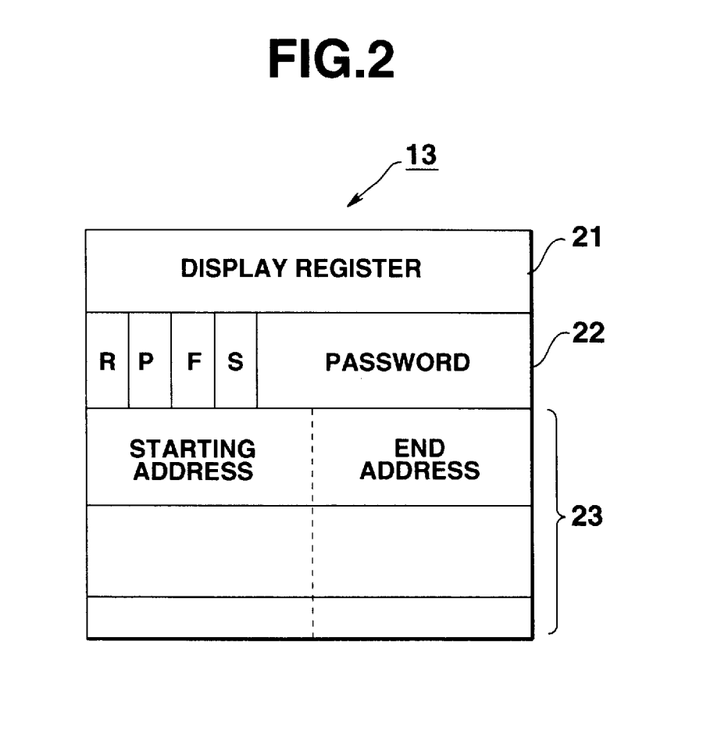
FIG. 2 schematically illustrates a structure of a RAM 13 employed in the data storing/reproducing apparatus shown in FIG. 2.

Referring now to FIG. 2, a storage structure of the RAM 13 will be explained. As shown in RAM 13 of FIG. 2, a display register 21 and an under-recording flag "R" are provided. The display register 21 stores display data to be displayed on the display unit 15. The under-recording flag "R" is set as "1" during the recording operation, and is set as "0" during any operations other than this recording operation. Also, an under-reproducing flag "P", a secrecy-set flag "F", and a password-coincident flag "S" are provided in the RAM 13. The under-reproducing flag "P" is set as "1" during the reproducing operation, and is set as "0" during any operations other than this reproducing operation. The secrecy-set flag "F" is set as "1" under secrecy setting condition such that either all of the voice data or a portion of voice data is not wanted to be reproduced, and is set as "0" under any conditions other than the above-described secrecy setting condition. The password-coincident flag "S" is set as "1" when an inputted password is made coincident with the stored password, and is-set as "0" when the inputted password is not made coincident with the stored password.

Furthermore, a password storage portion 22 for storing password data, and a start/end address storage portion 23 constituted by a plurality of storage regions are provided in this RAM 13. The plural storage regions of the start/end address storage portion 23 correspond to a storage region for storing secret voice data, namely, a starting address and an end address of secret voice data among the voice data stored in the voice memory 8.

The starting address and the end address are stored in accordance with the following manner. That is, when a designation key is manipulated under secrecy setting condition, the address data of the address control circuit 11 in such a case that the designation key is turned ON is written as the starting address into the start/end address storage portion 23, whereas the address data thereof in such a case that the designation key is turned OFF is written as the end address into the start/end address storage portion 23.

It should also be noted that plural sets of these start/end addresses may be set every a series of voice data, and a plurality of secret portions among a series of voice data may be designated.

OPERATIONS OF DATA RECORDING/REPRODUCING APPARATUS

Operations of the data recording/reproducing apparatus with the above-described arrangement will now be described with reference to flow charts shown in FIG. 3 and FIG. 4.

Figure 3:
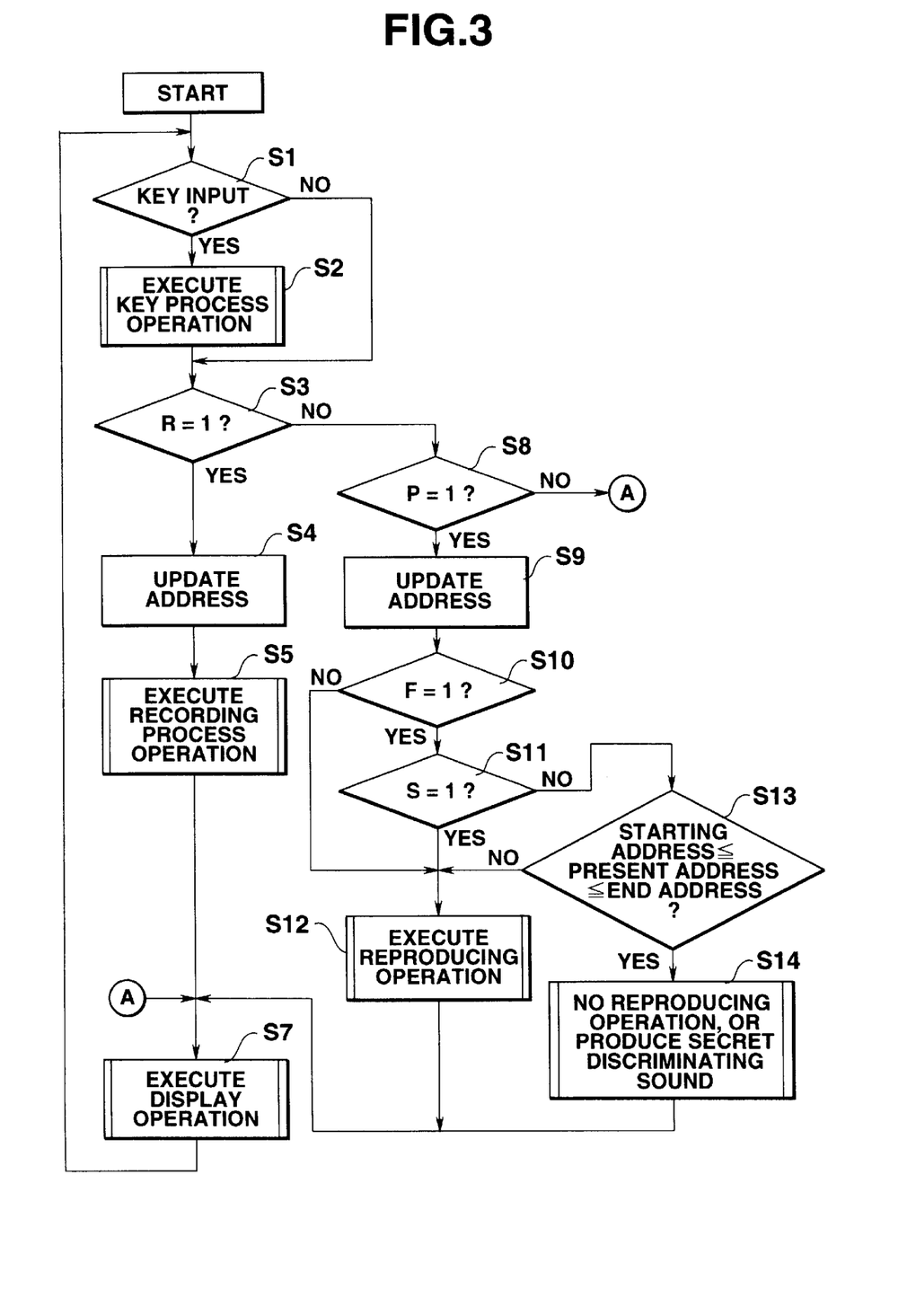
FIG. 3 is a flow chart for describing overall operation of the data storing/recording apparatus shown in FIG. 1.

At a first step S1 of the flow chart shown in FIG. 3, a judgment is made as to whether or not the key input operation is executed. When any key is operated, a key process operation defined at the next step S2 is executed. Subsequently, this key process operation will now be explained with reference to the flow chart of FIG. 4.

Figure 4:
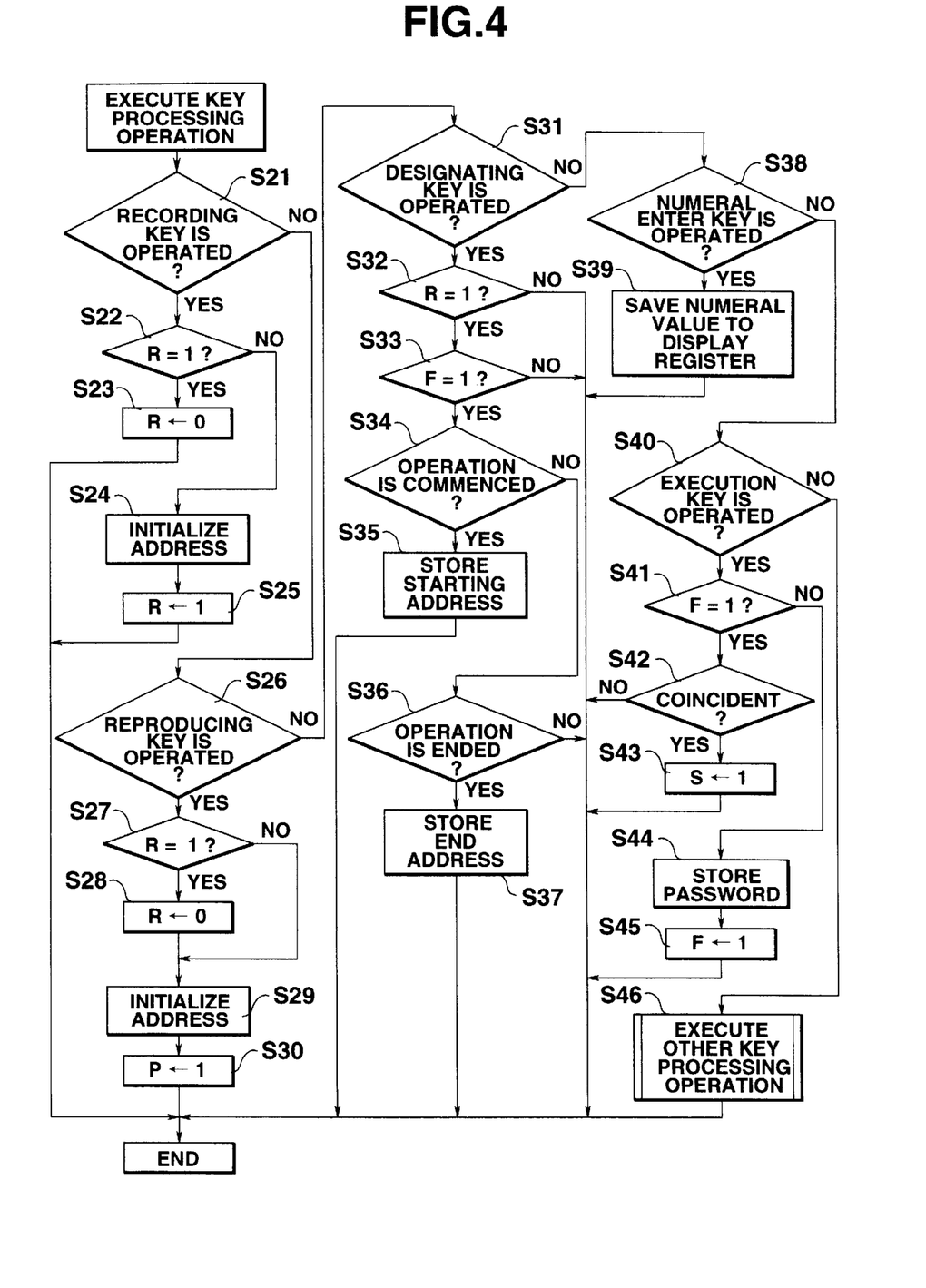
FIG. 4 is a flow chart for describing a key process operation of the overall operation of FIG. 3.

At a step S21 of the flow chart shown in FIG. 4, a check is first made as to whether or not the manipulated key corresponds to a recording key. When it is so judged at this step S21 that the manipulated key is the recording key, another check is done at a step S22 as to whether or not the state of the under-recording flag "R" is equal to "1", namely, whether or not the recording key is manipulated under recording condition. When the recording key is manipulated under recording condition (S22, "YES"), the under-recording flag "R" is set to "0" so as to release the recording condition.

To the contrary, when the under-recording flag "R" is set as "0" as the judgment result at the step S22, the address outputted from the address control circuit 11 is initialized, and the under-recording flag "R" is set to "1", so that the data recording/reproducing apparatus is brought into the recording condition at a step S25.

When it is judged at the step S21 that the recording key is not manipulated (S21, "NO"), the process operation is advanced to a step S26 at which a check is made as to whether or not the manipulated key corresponds to the reproducing key. When the manipulated key is the reproducing key (S26, "YES"), another check is made as to whether or not the under-recording flag "R" is set as "1", namely whether or not the reproducing key is manipulated under the recording condition at a step S27. When the state of the under-recording flag "R" is equal to "1", namely when the reproducing key is manipulated under the recording condition, this under-recording flag "R" is set to "0" and the recording condition is released at a step S28. Furthermore, the address outputted from the address control circuit 11 is initialized at a step S29, and then the under-reproducing flag "P" is set to "1" in order that the operation condition of the data recording/reproducing apparatus is switched to the reproducing condition.

In the case that it is so judged at a step S26 that the manipulated key is not the reproducing key (namely, "NO" at step S26), the process operation is advanced to a step S31 at which another check is made as to whether or not the designation key is operated. When the designation key is operated (S31, "YES"), a judgment is made as to whether or not the state of the under-recording flag "R" is equal to "1" at a step S32. When the under-recording flag "R" is set as "1", another check is done as to whether or not the state of the secrecy-set flag "F" is equal to "1" at a step S33. In such a case that the designation key is operated during the recording operation under such a condition that the secrecy is set, a check is made as to whether or not the operation of this designation key is commenced at a step S34. If the present key manipulation corresponds to the commencement of the designation key operation, then a write address outputted from the address control circuit 11 at this time is stored as the starting address of the secret portion into the start/end address storage portion 23 of the RAM 13 at a step S35.

Then, while the designation key is manipulated, the process operation is advanced from the step S34 to a step S36 at which a check is made as to whether or not the manipulation of the designation key is ended. That is, the check result becomes "NO" until the manipulation of this designation key is accomplished, so that a series of the above-described process operations are repeatedly executed. When it is so judged at the step S34 that the present key operation corresponds to the completion of the designation key operation, namely, when the designation key which has been turned ON is turned OFF, an address outputted from the address control circuit 11 at this time is stored as the end address into the start/end address storage portion 28 of the RAM 13.

In other words, if the designation key is turned ON during the recording operation under such a condition that the data recording/reproducing apparatus is set to the secret condition, the write address of the voice data at this time is stored as the starting address, and thereafter, a write address of the voice data when the designation key is turned OFF is saved as the end address into the start/end address storage portion 23.

It should be understood that when the secret voice data portion among the recorded voice data is designated in the above-described embodiment, if the designation key is manipulated during the recording operation, then both the recording start address and the recording end address of the voice data are stored. Alternatively, when the designation key is manipulated while the recorded voice data is reproduced so as to confirm the content of the reproduced voice data, a starting address and an end address of this reproduced voice data may be stored.

When it is judged at the step S31 that the designation key is not manipulated, the process operation is advanced to a step S38. At this step S38, a check is done as to whether or not the numeral entry key is manipulated. When the numeral entry key is operated (S38, "YES"), the inputted numeral data is written into the display register 21 of the RAM 13 at a step S39.

Conversely, when the numeral entry key is not manipulated at the step S38 (namely, "NO"), the process operation is advanced to a step S40. At this step S40, a judgment is made as to whether or not the execution key is manipulated. When the execution key is manipulated (S40, "YES"), another judgment is made as to whether or not the secrecy-set flag "F" is set as "1", namely whether or not the present condition is set to the secrecy setting condition at a step S41. When it is so judged at this step S41 that the state of the secrecy-set flag "F" is equal to "1", a further check is made as to whether or not the inputted password is made coincident with the password stored in the password storage portion 22 at a step S42. When it is judged that the entered password data is made in coincident with the stored password data, "1" is set to the password coincident flag "S" at a step S43. At this time, if the entered password data is not made coincident with the stored password data, then the content of the password coincident flag "S" remains at "0".

In such a judgment case at the step S41 that the state of the secrecy-set flag "F" is equal to "0", the presently entered data is stored into the password storage portion 22 at a step S44, and further, the secrecy-set flag "F" is set as "1" at a step S45.

In other words, under such a condition that the secrecy is not set, since the execution key is manipulated after the desired password has been entered by operating either the character key or the numeral value key, the arbitrary password is set to the password data storage portion 22, so that the operation condition of the data recording/reproducing apparatus can be switched into the secrecy set condition.

To the contrary, when it is judged at the step S40 that the execution key is not manipulated, the process operation is advanced to a step S46 at which other key process operations are executed.

Returning back to the flow chart shown in FIG. 3, when the key process operation defined at the step S2 is complete, the process operation is advanced to a step S3. At this step S3, a check is done as to whether or not the state of the under-recording flag "R" is equal to "1". If the under-recording flag "R" is set as "1", then an instruction is issued to the address control circuit 11 so as to update the address at a step S4 since the data recording/reproducing apparatus is set to the recording condition. Also, a write signal "a" is outputted to the voice memory 8, and the voice data entered from the microphone 6 is stored at the designated address of the voice memory 8 at a step S5. Then, the operation condition at this time is displayed on the display apparatus 15 at a step S7.

When it is judged at the step S3 that the state of the under-recording flag R is equal to "0" (S3, "No"), the process operation is advanced to a step S8. At this step S8, a check is done as to whether or not the state of the under-reproducing flag "P" is equal to "1". When the state of this under-reproducing flag "P" is equal to "1", since the voice data is being reproduced, the address control circuit 11 is instructed to update the address at the next step S9. Then, at a step S10, a further check is done as to whether or not the state of the secrecy-set flag "F" is equal to "1", namely whether or not the present condition is under secrecy-set condition under which if the password is not inputted, then the voice data cannot be reproduced. When it is judged that the state of the secrecy-set flag "F" is equal to "1", namely when it is judged that the present condition is under secrecy setting condition (S10, "YES"), another check is made as to whether or not the state of the password-coincident flag S is equal to "1" at a step S11.

When it is judged at this step S11 that the state of this password-coincident flag S is equal to "1", namely when the inputted password is made coincident with the password stored in the password storage portion 22 (S11, "YES"), a reproducing process operation defined at a step S12 is executed. In this reproducing process operation, the voice data stored at the designated address is read out from the voice memory 8, and then the read voice data is decoded so as to output the content of this voice data as voice from the speaker 10. Thereafter, the above-described display process operation defined at the step S7 is carried out. To the contrary, when it is judged that the state of the under-reproducing flag "P" is equal to "0" (step S8, "NO"), since the present operation corresponds to operations other than the recording operation and also the reproducing operation, the process operation is advanced to the step S7 at which the display process operation is executed.

Figure 5:
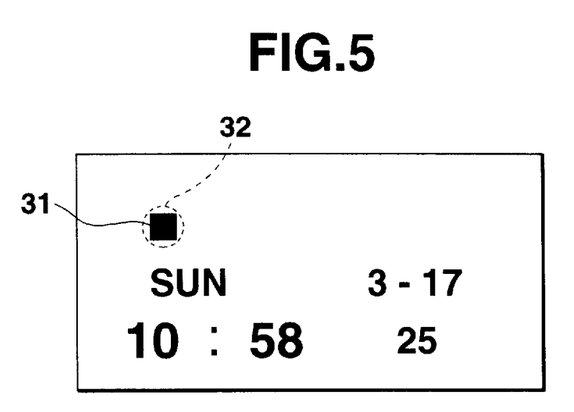
FIG. 5 indicates an example of a display condition during the reproducing operation of the data storing/reproducing apparatus.

FIG. 5 indicates an example of a display condition during the reproducing operation. FIG. 5 represents such a condition that one piece of voice data is stored. Since this voice data is stored, a mark 31 colored in black is displayed. In this case, the secrecy setting condition is displayed, and the black mark 31 is displayed in a flicker mode (symbol 32) every 1 second interval so as to identify that the recorded voice data corresponds to the secret voice data. When the secrecy is not set, this black mark 31 is not displayed in the flicker mode, but is continuously displayed.

As a consequence, it is possible to readily confirm whether or not the voice data to be reproduced is in a secrecy setting condition by checking for the presence of the black mark 31.

Returning back to the flow chart shown in FIG. 3, when it is judged at the step S11 that the state of the password coincident flag "S" is equal to "0", this condition implies that the correct password is not entered (otherwise, no password is inputted), so that the process operation is advanced to a step S13. At this step S13, a check is made as to whether or not the read address of the voice data obtained from the present voice data reproducing process operation is located in a range between the starting address and the end address, which have been stored in the start/end address storage unit 23 of the RAM 13.

In such a case that the entered password is not coincident with the stored password, and also the present address is located within the range between the starting address and the end address under the secrecy set condition, which are stored in the start/end address storage portion 23, namely, when the present address corresponds to the address while the designation key is manipulated during the recording operation, no reproducing operation is carried out with respect to the voice data stored in the voice data storage region addressed by this present address. Thus, such sounds are produced to the user, by which the user can recognize that silent data or voice data corresponds to data to which the secrecy is set at a step S14.

Alternatively, when the entered password is not made coincident with the stored password, the entire voice data stored in the voice memory 8, or the voice data between the stored start/end addresses may be read out by sequentially making the address designation along the reverse direction with respect to the above-described direction. As a result, the content of the voice data under the secrecy set condition is not disclosed to the third party. Moreover, it is possible to notify that the voice data to which the correct password is set is stored in the voice memory 8. This may be applied to another case that no designation is made as to whether or not each of the voice data is brought into the secrecy set condition, and the passwords must be entered in order to reproduce all of the voice data.

On the other hand, when it is judged at the step S13 that the present address is not entered into the address range stored in the start/end address storage portion 23, the above-explained reproducing process operation defined at the step S12 is executed, by which the voice data at the presently designated address is directly reproduced. Thereafter, the display process operation defined at the step S7 is executed.

In the above-described embodiment, when the voice data is recorded or reproduced, the user can designate voice data among a series of voice data to be directly reproduced, and voice data which is not to be reproduced unless a correct password is inputted (namely, so that reproduction of designated voice data is blocked). As a consequence, while maintaining the secrecy of the voice data which is not wanted to be disclosed to a third party, the voice data other than the above-described secret voice data can be reproduced without cumbersome entries of passwords.

MODIFICATION

Figure 6:
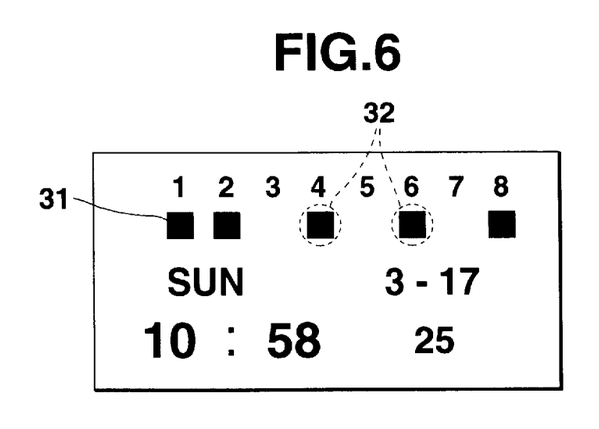
FIG. 6 represents an example of another display condition during reproducing operation of another data storing/reproducing apparatus of the present invention.
Figure 7:
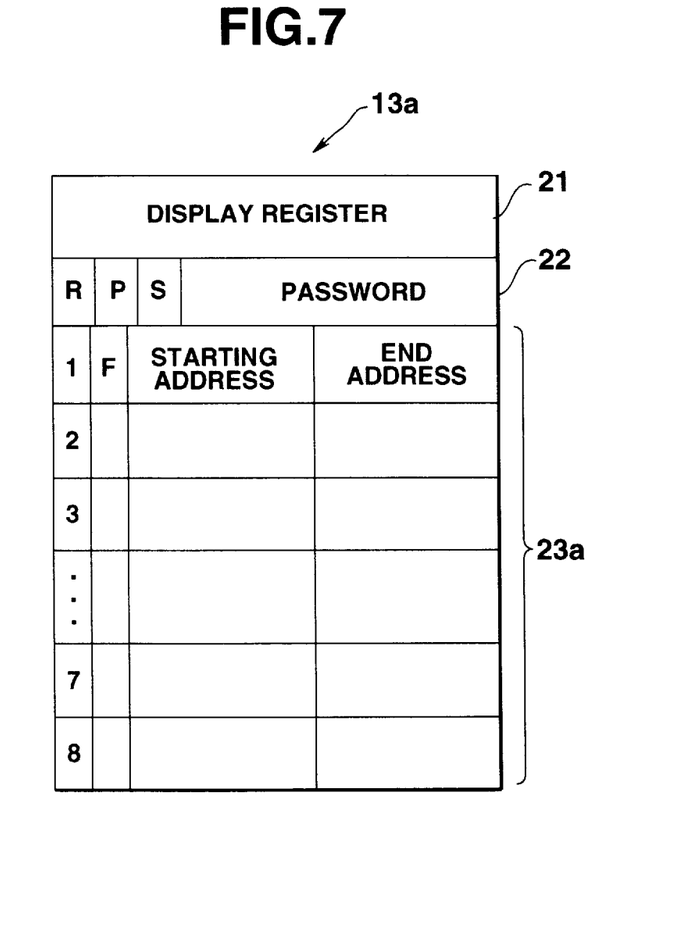
FIG. 7 schematically illustrates a structure of a RAM 13a employed in the data storing/reproducing apparatus shown in FIG. 7.

FIG. 6 schematically illustrates one example of a display condition during reproducing operation in a data recording/reproducing apparatus capable of storing a plurality of voice data according to another embodiment of the present invention. In this embodiment, 8 pieces of voice data can be stored. The ROM 13a of FIG. 7 is equipped with secrecy-set flags "F" and start/end address storage portions 23a with respect to each of first to eighth voice data. FIG. 6 represents such a condition that the voice data are stored at the first, second, fourth, and eighth storage regions. Among these storage regions, the voice data of the first, second, and eighth storage regions on which the black mark 31 is continuously displayed are not under secrecy-set condition, whereas the voice data of the fourth and sixth storage regions on which the mark 31 is displayed in the flicker mode with a 1 second interval are under secret-set condition (indicated by reference numeral 32). Then, this display indicates that the voice data of the fourth storage region, which is displayed in the flicker mode with a 0.5 second interval, is presently reproduced.

As apparent from the foregoing descriptions, the present invention is not limited to the above-described electronic wrist watch, but may be applied to electronic appliances such as electronic notebooks, and also to telephone sets having automatic answering functions.

What is claimed is:

1. A data storing/reproducing apparatus comprising:
    data input means for inputting data;
    range designating means for designating an arbitrary range within the data inputted by said data input means;
    data storing means for storing the data inputted by said data input means;
    detecting means for detecting whether or not data to be outputted includes data present in the range designated by said range designating means; and output control means for controlling an output device not to output the data present within said range when a detection is made by said detecting means that the data to be outputted includes data present in the range designated by said range designating means.

2. A data storing/reproducing apparatus as claimed in claim 1 wherein:

said data comprises voice data; and said range designating means comprises simultaneous range designating means for designating an arbitrary range in the inputted voice data when the voice data is inputted.

3. A data storing/reproducing apparatus as claimed in claim 1 wherein:

said data storing means comprises address data storing means for sequentially storing the inputted data in correspondence with address data; and said range designating means includes address designating means for designating the range by designating an address of said data storing means.

4. A data storing/reproducing apparatus as claimed in claim 1 wherein said range designating means comprises plural range setting means for arbitrarily setting a plurality of ranges in the inputted data.

5. A data storing/reproducing apparatus as claimed in claim 1 wherein said output control means includes range output means for controlling said output device to output data different from said data present in said range when said detecting means detects that said data to be outputted includes data present in the range designated by said range designating means.

6. A data storing/reproducing apparatus as claimed in claim 1 wherein said range designating means includes a key input unit and key input means for designating an interval between successive key input operations by said key input unit as the designated range.

7. A data storing/reproducing apparatus as claimed in claim 1 wherein:

said storing means comprises data storing means for storing a plurality of data; and said range setting means comprises data-depended-range designating means for arbitrarily designating a plurality of ranges, each corresponding to one of the plural data stored in said data storing means.

8. A data storing/reproducing apparatus as claimed in claim 1 further comprising:

secret function executing means for, when a password is set, outputting the stored data only when the password is inputted; and password control means for causing said output control means to operate only in when the password is both not set and not inputted.

9. A data outputting method comprising:

inputting data;

designating an arbitrary range within the inputted data;

storing the inputted data;

detecting whether or not data to be outputted includes data present in the designated range; and controlling an output device not to output the data present within said range when a detection is made that the data to be outputted includes the data present in the designated range.

10. A recording medium for recording thereon a data output program for enabling a computer to operate as:

data storing means for storing inputted data;

detecting means for detecting whether or not data to be outputted includes data present in a designated range; and output control means for controlling an output device not to output the data present within said range when a detection is made by said detecting means that the data to be outputted includes the data present in the designated range.

* * * * *